(12) United States Patent
Logan et al.

(10) Patent No.: US 9,223,825 B2
(45) Date of Patent: Dec. 29, 2015

(54) METHODS AND DEVICES FOR APPLYING CONSTRAINTS TO DATA OBJECT

(71) Applicant: RESEARCH IN MOTION LIMITED, Waterloo (CA)

(72) Inventors: Adrian Michael Logan, Waterloo (CA); Stephen Kwok Sun Wong, Thornnill (CA); Joshua Roland Lessard, Waterloo (CA)

(73) Assignee: BLACKBERRY LIMITED, Waterloo, Ontario (CA)

( * ) Notice: Subject to any disclaimer, the term of this patent is extended or adjusted under 35 U.S.C. 154(b) by 166 days.

(21) Appl. No.: 13/739,068

(22) Filed: Jan. 11, 2013

(65) Prior Publication Data
US 2014/0052723 A1 Feb. 20, 2014

Related U.S. Application Data

(60) Provisional application No. 61/691,108, filed on Aug. 20, 2012.

(51) Int. Cl.
*G06F 7/00* (2006.01)
*G06F 17/30* (2006.01)
*G06Q 10/10* (2012.01)

(52) U.S. Cl.
CPC ........ *G06F 17/30386* (2013.01); *G06Q 10/109* (2013.01)

(58) Field of Classification Search
CPC ... G06F 17/30; G06F 17/30386; G06Q 10/10; G06Q 10/109
See application file for complete search history.

(56) References Cited

U.S. PATENT DOCUMENTS

| | | | |
|---|---|---|---|
| 5,917,489 A | 6/1999 | Thurlow et al. | |
| 7,583,972 B2 | 9/2009 | Clipsham | |
| 8,000,547 B2 | 8/2011 | Yang et al. | |
| 2003/0061225 A1 | 3/2003 | Bowman et al. | |
| 2004/0162891 A1* | 8/2004 | Volnak | 709/218 |
| 2005/0091184 A1 | 4/2005 | Seshadri et al. | |
| 2007/0099657 A1 | 5/2007 | Scott | |
| 2007/0185754 A1* | 8/2007 | Schmidt | 705/9 |
| 2007/0266022 A1* | 11/2007 | Frumkin et al. | 707/5 |
| 2008/0123917 A1* | 5/2008 | Magsig et al. | 382/128 |
| 2008/0306750 A1* | 12/2008 | Wunder et al. | 705/1 |
| 2010/0235447 A1 | 9/2010 | Goodman et al. | |
| 2010/0333014 A1 | 12/2010 | Fritzley et al. | |
| 2011/0231401 A1 | 9/2011 | Bocking et al. | |

FOREIGN PATENT DOCUMENTS

| | | | |
|---|---|---|---|
| EP | 2098962 | 9/2009 | |
| WO | 2010066617 | 6/2010 | |
| WO | WO2014000786 A1 * | 1/2014 | G06F 17/30 |

OTHER PUBLICATIONS

EPO, Extended European Search Report relating to Application No. 13150944.0, dated Apr. 16, 2014.
Pimlico Services Inc., "Pimlical—An Advanced Calender and PIM Application Designed for Multiple Platforms", Sep. 7, 2012.
Blackberry, Desktop Software, "Why Install the Blackberry Desktop Software?", retrieved Oct. 2, 2012.

* cited by examiner

*Primary Examiner* — Azam Cheema
(74) *Attorney, Agent, or Firm* — Rowand LLP (57) ABSTRACT

In one example embodiment, a processor-implemented method is described. The processor implemented method includes: associating a first notebook with one or more predetermined constraints; receiving input associating a data object with a notebook; and when the notebook associated with the data object is the first notebook, applying the one or more predetermined constraints associated with the first notebook to the data object.

16 Claims, 4 Drawing Sheets

METHODS AND DEVICES FOR APPLYING CONSTRAINTS TO DATA OBJECT

TECHNICAL FIELD

The present application relates to data objects and, more particularly, to methods and electronic devices for applying constraints to data objects.

BACKGROUND

A personal information manager (PIM) is an application that functions as an organizer of information for a user. Personal information managers often organize addresses, personal notes and journal entries, tasks, reminders, archived email messages, etc.

Personal information managers often allow a user to create tasks. Tasks may, for example, be to-do items. That is, a task may be a record of an action that a user wishes to perform or complete. Tasks may be manually input into the personal information manager by a user. For example, a user may use a keyboard to manually compose the task. Some personal information managers may allow the task to be associated with a date and a reminder of the task to be generated based on the date. Tasks may be presented in a list (which may be referred to as a to-do list) which may include other tasks.

BRIEF DESCRIPTION OF THE DRAWINGS

Reference will now be made, by way of example, to the accompanying drawings which show example embodiments of the present application, and in which.

Like reference numerals are used in the drawings to denote like elements and features.

DETAILED DESCRIPTION

In one example embodiment, a processor-implemented method is described. The processor implemented method includes: associating a first notebook with one or more predetermined constraints; receiving input associating a data object with a notebook; and when the notebook associated with the data object is the first notebook, applying the one or more predetermined constraints associated with the first notebook to the data object.

In another example embodiment, an electronic device is described. The electronic device includes a processor and a memory coupled with the processor. The memory contains processor executable instructions which, when executed by the processor, cause the processor to: associate a first notebook with one or more predetermined constraints; receive input associating a data object with a notebook; and when the notebook associated with the data object is the first notebook, apply the one or more predetermined constraints associated with the first notebook to the data object.

In yet another example embodiment, a computer readable storage medium is described. The computer reading storage medium includes computer executable instructions for: associating a first notebook with one or more predetermined constraints; receiving input associating a data object with a notebook; and when the notebook associated with the data object is the first notebook, applying the one or more predetermined constraints associated with the first notebook to the data object.

Other example embodiments of the present disclosure will be apparent to those of ordinary skill in the art from a review of the following detailed description in conjunction with the drawings.

Example embodiments of the present disclosure are not limited to any particular operating system, electronic device architecture, server architecture or computer programming language.

Example Operating Environment

Figure 1:
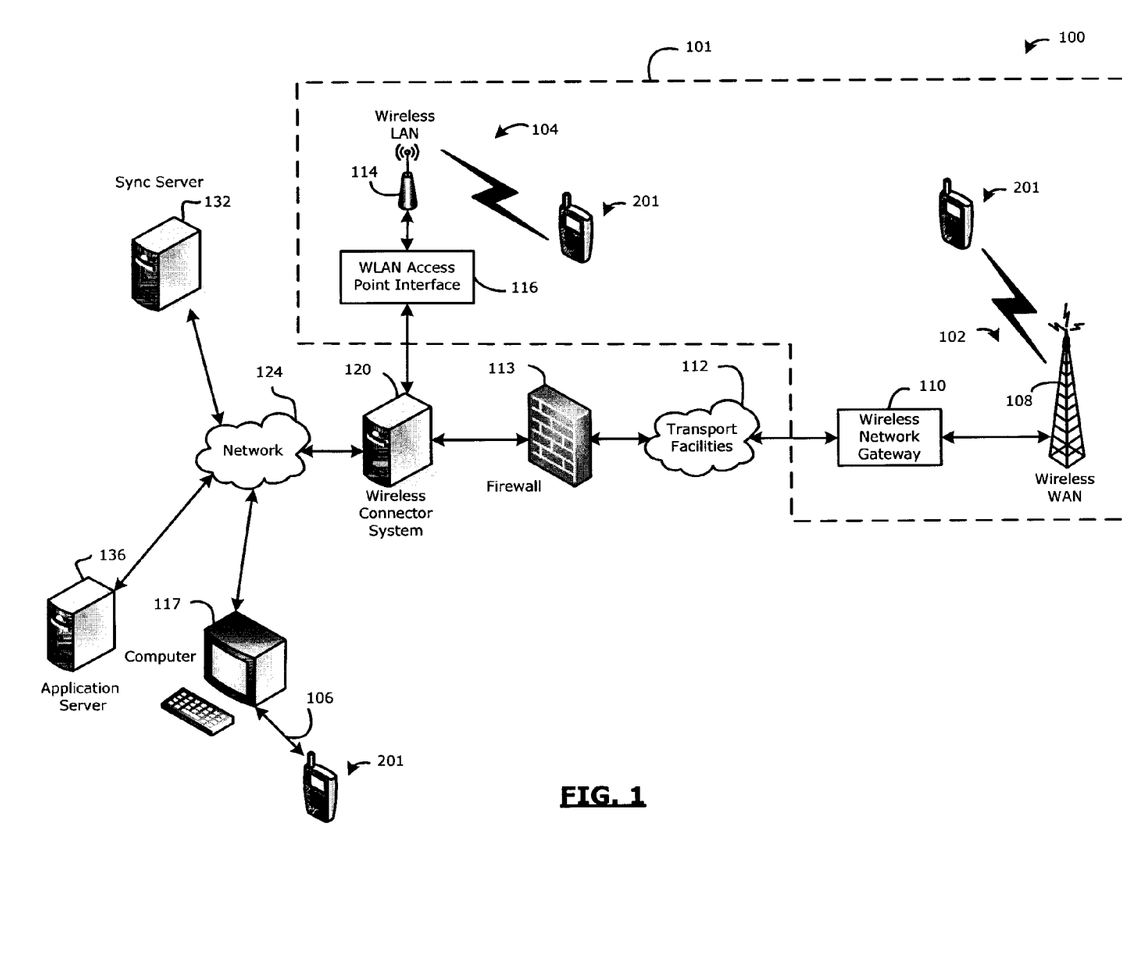
FIG. 1 is a block diagram illustrating an example operating environment in which example electronic devices may operate.

In order to facilitate an understanding of one possible environment in which example embodiments described herein can operate, reference is first made to FIG. 1 which shows in block diagram form a communication system 100 in which example embodiments of the present disclosure can be applied. The communication system 100 includes a number of electronic devices 201 which may be connected to the remainder of the system 100 in any of several different ways. Accordingly, several instances of electronic devices 201 are depicted in FIG. 1 employing different example ways of connecting to system 100. Electronic devices 201 are connected to a wireless network 101 which may include one or more of a Wireless Wide Area Network (WWAN) 102 and a Wireless Local Area Network (WLAN) 104 or other suitable network arrangements. In some example embodiments, the electronic devices 201 are configured to communicate over both the WWAN 102 and WLAN 104, and to roam between these networks. In some example embodiments, the wireless network 101 may include multiple WWANs 102 and WLANs 104.

The WWAN 102 may be implemented as any suitable wireless access network technology. By way of example, but not limitation, the WWAN 102 may be implemented as a wireless network that includes a number of transceiver base stations 108 (one of which is shown in FIG. 1) where each of the base stations 108 provides wireless Radio Frequency (RF) coverage to a corresponding area or cell. The WWAN 102 is typically operated by a mobile network service provider that provides subscription packages to users of the electronic devices 201. In some example embodiments, the WWAN 102 conforms to one or more of the following wireless network types: Mobitex Radio Network, DataTAC, GSM (Global System for Mobile Communication), GPRS (General Packet Radio System), TDMA (Time Division Multiple Access), CDMA (Code Division Multiple Access), CDPD (Cellular Digital Packet Data), iDEN (integrated Digital Enhanced Network), EvDO (Evolution-Data Optimized) CDMA2000, EDGE (Enhanced Data rates for GSM Evolution), UMTS (Universal Mobile Telecommunication Systems), HSPDA (High-Speed Downlink Packet Access), IEEE 802.16e (also referred to as Worldwide Interoperability for Microwave Access or "WiMAX"), or various other networks. Although WWAN 102 is described as a "Wide-Area" network, that term is intended herein also to incorporate wireless Metropolitan Area Networks (WMAN) and other similar technologies for providing coordinated service wirelessly over an area larger than that covered by typical WLANs.

The WWAN 102 may further include a wireless network gateway 110 which connects the electronic devices 201 to transport facilities 112, and through the transport facilities 112 to a wireless connector system 120. Transport facilities may include one or more private networks or lines, the public Internet, a virtual private network, or any other suitable network. The wireless connector system 120 may be operated, for example, by an organization or enterprise such as a corporation, university, or governmental department, which allows access to a network 124 such as an internal or enterprise network and its resources, or the wireless connector system 120 may be operated by a mobile network provider. In some example embodiments, the network 124 may be realised using the Internet rather than an internal or enterprise network.

The wireless network gateway 110 provides an interface between the wireless connector system 120 and the WWAN 102, which facilitates communication between the electronic devices 201 and other devices (not shown) connected, directly or indirectly, to the WWAN 102. Accordingly, communications sent via the electronic devices 201 are transported via the WWAN 102 and the wireless network gateway 110 through transport facilities 112 to the wireless connector system 120. Communications sent from the wireless connector system 120 are received by the wireless network gateway 110 and transported via the WWAN 102 to the electronic devices 201.

The WLAN 104 includes a wireless network which, in some example embodiments, conforms to IEEE 802.11x standards (sometimes referred to as Wi-Fi) such as, for example, the IEEE 802.11a, 802.11b and/or 802.11g standard. Other communication protocols may be used for the WLAN 104 in other example embodiments such as, for example, IEEE 802.11n, IEEE 802.16e (also referred to as Worldwide Interoperability for Microwave Access or "WiMAX"), or IEEE 802.20 (also referred to as Mobile Wireless Broadband Access). The WLAN 104 includes one or more wireless RF Access Points (AP) 114 (one of which is shown in FIG. 1) that collectively provide a WLAN coverage area.

The WLAN 104 may be a personal network of the user, an enterprise network, or a hotspot offered by an Internet service provider (ISP), a mobile network provider, or a property owner in a public or semi-public area, for example. The access points 114 are connected to an access point (AP) interface 116 which may connect to the wireless connector system 120 directly (for example, if the access point 114 is part of an enterprise WLAN 104 in which the wireless connector system 120 resides), or indirectly via the transport facilities 112 if the access point 114 is a personal Wi-Fi network or Wi-Fi hotspot (in which case a mechanism for securely connecting to the wireless connector system 120, such as a virtual private network (VPN), may be used). The AP interface 116 provides translation and routing services between the access points 114 and the wireless connector system 120 to facilitate communication, directly or indirectly, with the wireless connector system 120.

The wireless connector system 120 may be implemented as one or more servers, and is typically located behind a firewall 113. The wireless connector system 120 manages communications, including email communications, to and from a set of managed electronic devices 201. The wireless connector system 120 also provides administrative control and management capabilities over users and electronic devices 201 which may connect to the wireless connector system 120.

The wireless connector system 120 allows the electronic devices 201 to access the network 124 and connected resources and services such as a sync server 132 (for example, a Microsoft Exchange™, IBM Lotus Domino™, or Novell GroupWise™ server), and application servers 136 for implementing server-based applications such as instant messaging (IM) applications to electronic devices 201.

The sync server 132 may provide back-end data syncing services to the electronic device 201. For example, the sync server 132 may sync data objects, such as action items (i.e. tasks), email messages, and/or memos on the electronic device 201 with one or more other electronic devices associated with a common user account, and/or with a remote server associated with the same account (e.g. data objects stored on the electronic device 201 may be sent, through the sync server 132 to other electronic devices associated with the same user account or may be sent to a remote server associated with the same account). That is the sync server 132 may allow an electronic device to sync a data object stored on the electronic device 201 using the sync server. Similarly, the sync server 132 may sync data objects stored in another storage location associated with the same user account (such as another electronic device or remote server) to the electronic device 201. That is, the sync server 132 may transmit data objects stored in other storage locations to the electronic device 201.

In at least some embodiments, the sync server 132 may have one or more predetermined constraints associated therewith. More particularly, the sync server may have data object constraints. Data object constraints may specify formatting rules that are applied to one or more types of data objects. That is, the data object constraints may specify constraints that are related to a data object type associated with the data object.

For example, the data object constraints may, in some embodiments, specify that a data object that is classified as a memo (i.e. a data object having a memo data object type) will not include a completion indicator and/or progress indicator. Similarly, in some embodiments, the data object constraints may specify that a data object that is classified as an action item (which may also be referred to as a task) must have a completion indicator and/or progress indicator associated therewith.

A completion indicator may be a flag that may be set to "complete" or "incomplete" to indicate whether the action associated with an action item has been completed. In some embodiments, the completion indicator may have two possible values—a first value represents a complete state and a second value represents an incomplete state. A progress indicator is a type of completion indicator that may allow greater precision in describing a status of an action item. For example, a progress indicator may specify the degree to which the action has been completed (e.g. it may be specified as a percentage, such as 50%). In some embodiments, the progress indicator may allow a text-based status to be set to indicate the level of completion of the action associated with an action item. By way of example, the progress indicator may be set to "not started", "in progress," "waiting for feedback," or "done."

Since action items, by their nature, have an action associated therewith, the sync server 132 may require that data objects which purport to be an action item have a completion indicator associated with such data objects. Similarly, since an action is generally not required in relation to a memo, the sync server 132 may require that data objects that purport to be memos do not have a completion indicator associated therewith.

Similarly, in some embodiments, the sync server 132 may require that data objects which purport to be an action item have a due date property associated therewith. The due date property may be reserved for storing a due data associated with action items. That is, the due date property may be configured for storing timing information for completing the action represented by the action item.

In at least some embodiments, the sync server 132 may be configured to only sync data objects when such data objects satisfy the data object constraints. For example, in at least some embodiments, when a data object does not satisfy the constraints for the data object type of that data object, it may be considered a sync-unfriendly data object and may fail to sync and/or generate an error when a sync operation is attempted.

The wireless connector system 120 typically provides a secure exchange of data (e.g., email messages, personal information manager (PIM) data, and IM data) with the electronic devices 201. In some example embodiments, communications between the wireless connector system 120 and the electronic devices 201 are encrypted. In some example embodiments, communications are encrypted using a symmetric encryption key implemented using Advanced Encryption Standard (AES) or Triple Data Encryption Standard (Triple DES) encryption. Private encryption keys are generated in a secure, two-way authenticated environment and are used for both encryption and decryption of data. In some example embodiments, the private encryption key is stored only in the user's mailbox on the sync server 132 and on the electronic device 201, and can typically be regenerated by the user on electronic devices 201. Data sent to the electronic devices 201 is encrypted by the wireless connector system 120 using the private encryption key retrieved from the user's mailbox. The encrypted data, when received on the electronic devices 201, is decrypted using the private encryption key stored in memory. Similarly, data sent to the wireless connector system 120 from the electronic devices 201 is encrypted using the private encryption key stored in the memory of the electronic device 201. The encrypted data, when received on the wireless connector system 120, is decrypted using the private encryption key retrieved from the user's mailbox.

The wireless network gateway 110 is adapted to send data packets received from the electronic device 201 over the WWAN 102 to the wireless connector system 120. The wireless connector system 120 then sends the data packets to the appropriate connection point such as the sync server 132 or application servers 136. Conversely, the wireless connector system 120 sends data packets received, for example, from the sync server 132 or application servers 136 to the wireless network gateway 110 which then transmit the data packets to the destination electronic device 201. The AP interfaces 116 of the WLAN 104 provide similar sending functions between the electronic device 201, the wireless connector system 120 and network connection point such as the sync server 132 and application server 136.

The network 124 may include a private local area network, metropolitan area network, wide area network, the public Internet or combinations thereof and may include virtual networks constructed using any of these, alone, or in combination.

An electronic device 201 may alternatively connect to the wireless connector system 120 using a computer 117, such as desktop or notebook computer, via the network 124. A link 106 may be provided for exchanging information between the electronic device 201 and computer 117 connected to the wireless connector system 120. The link 106 may include one or both of a physical interface and short-range wireless communication interface. The physical interface may include one or combinations of an Ethernet connection, Universal Serial Bus (USB) connection, Firewire™ (also known as an IEEE 1394 interface) connection, or other serial data connection, via respective ports or interfaces of the electronic device 201 and computer 117. The short-range wireless communication interface may be a personal area network (PAN) interface. A personal area network is a wireless point-to-point connection meaning no physical cables are required to connect the two end points. The short-range wireless communication interface may include one or a combination of an infrared (IR) connection such as an Infrared Data Association (IrDA) connection, a short-range radio frequency (RF) connection such as one specified by IEEE 802.15.1 or the Bluetooth™ special interest group, or IEEE 802.15.3a, also referred to as Ultra-Wideband (UWB), or other PAN connection.

It will be appreciated that the above-described communication system is provided for the purpose of illustration only, and that the above-described communication system includes one possible communication network configuration of a multitude of possible configurations for use with the electronic devices 201. The teachings of the present disclosure may be employed in connection with other types of networks and associated devices that are effective in implementing or facilitating wireless communication. Suitable variations of the communication system will be understood to a person of skill in the art and are intended to fall within the scope of the present disclosure.

Example Electronic Device

Figure 2:
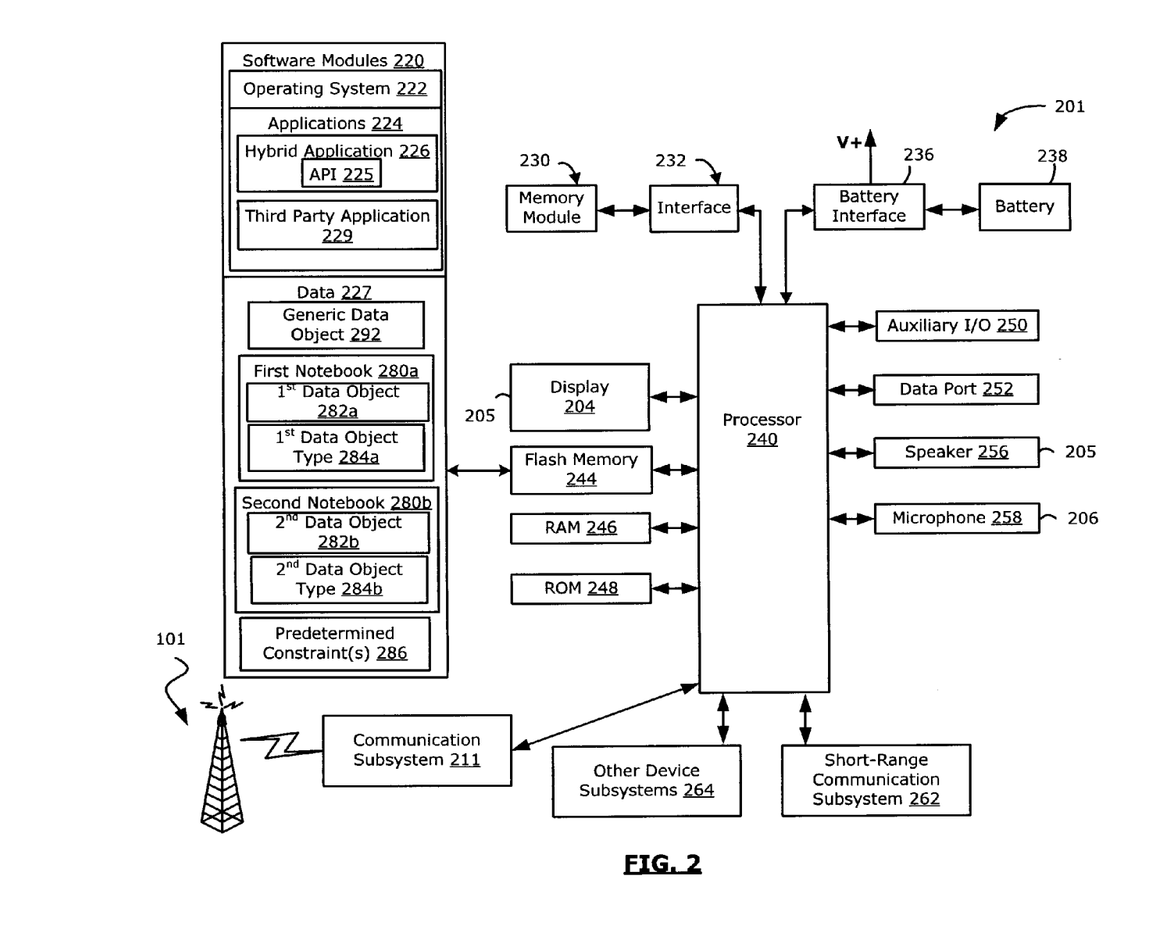
FIG. 2 is a block diagram illustrating an example electronic device in accordance with example embodiments of the present disclosure.

Reference is now made to FIG. 2 which illustrates an example electronic device 201. In the illustrated example embodiment, the electronic device 201 is a communication device, such as a mobile communication device. In at least some example embodiments, the electronic device 201 is a two-way communication device having data and voice communication capabilities, and the capability to communicate with other computer systems, for example, via the Internet. Depending on the functionality provided by the electronic device 201, in various example embodiments the electronic device 201 may be a multiple-mode communication device configured for data and voice communication, a mobile telephone such as a smart phone, a tablet computer such as a slate computer, an electronic book reader, a wearable computer such as a watch, a PDA (personal digital assistant), or a computer system.

A smartphone is a mobile phone which offers more advanced computing capabilities than a basic non-smartphone cellular phone. For example, a smartphone may have an ability to run third party applications which are stored on the smartphone.

A tablet computer (which may also be referred to as a tablet) is an electronic device 201 which is generally larger than a mobile phone (such as a smartphone) or personal digital assistant. Many mobile phones or personal digital assistants are designed to be pocket sized. That is, mobile phones or personal digital assistants are generally small enough to be carried by a person easily, often in a shirt or pant pocket while tablet computers are larger and may not fit within pant pockets. For example, many tablet computers have a height which is seven inches (7") or more. In some example embodiments, the tablet computer may be a slate computer. A slate computer is a tablet computer which does not include a dedicated keyboard. A slate computer may allow for text input through the use of a virtual keyboard or an external keyboard which connects to the slate computer via a wired or wireless connection.

In at least some embodiments, the electronic device 201 is a handheld electronic device. A handheld electronic device is an electronic device 201 which is sufficiently small to be held in the hands of a user. The term handheld electronic device includes smartphones and may also include tablet computers. In at least some embodiments, the handheld electronic device may be sufficiently small to be held in a single hand of a user. For example, the handheld electronic device may be a palm-sized device which is sized to be held in the palm of a user's hand. From the description which follows, it will be appreciated that the techniques and methods described herein may be used in electronic devices 201 having limited display capabilities. For example, the methods of storing, classifying and accessing content described herein may be used with the relatively small displays provided by smartphones.

In other example embodiments, the electronic device 201 may be of a type not specifically listed above.

The electronic device 201 includes a housing (not shown) which houses components of the electronic device 201. The internal components of the electronic device 201 are constructed on a printed circuit board (PCB). The electronic device 201 includes a controller including at least one processor 240 (such as a microprocessor) which controls the overall operation of the electronic device 201. The processor 240 interacts with device subsystems, such as a wireless communication subsystem 211 for exchanging radio frequency signals with a wireless network 101 to perform communication functions. The processor 240 interacts with additional device subsystems including one or more input interfaces 206 (such as a keyboard, one or more control buttons, one or more microphones 258, and/or a touch-sensitive overlay associated with a touchscreen display, etc.), flash memory 244, random access memory (RAM) 246, read only memory (ROM) 248, auxiliary input/output (I/O) subsystems 250, a data port 252 (which may be a serial data port, such as a Universal Serial Bus (USB) data port), one or more output interfaces 205 (such as a display 204, one or more speakers 256, or other output interfaces), a short-range communication subsystem 262, and other device subsystems generally designated as 264. Some of the subsystems shown in FIG. 2 perform communication-related functions, whereas other subsystems may provide "resident" or on-device functions.

One or more of the input interfaces 206 may be configured for receiving user input to allow a user to interact with the electronic device 201. Such input interfaces 206 may, for example, allow a user to interact with a graphical user interface provided on the electronic device 201. Instructions, commands, or other forms of input may be received by the electronic device 201 via the input interfaces. For example, the input interfaces 206 may allow a user to interact with one or more interface elements displayed on a graphical user interface of the display 204.

Such input interfaces 206 may take a variety of forms. For example, any one or combination of the following input interfaces 206 may be included on the electronic device 201 and used for receiving user input: a touchscreen display, a control button, a trackball or trackpad, a keyboard, a camera (which may be used, for example, to detect gesture-based input), an orientation or acceleration sensor such as an accelerometer (which may be used, for example, to detect gesture-based input performed by moving the electronic device 201), a microphone 258 (which may be used, for example, to detect voice-based commands). It will be appreciated that the foregoing list of input interfaces 206 is not exhaustive and that other input interfaces 206 may be used instead of or in addition to any of the interfaces 206 described above.

As noted previously, the electronic device 201 may include a touch-sensitive display 204 which may be referred to as a touchscreen or a touchscreen display 204. The touchscreen display 204 may be constructed using a touch-sensitive input surface connected to an electronic controller. The touch-sensitive input surface overlays the touchscreen display 204 and may be referred to as a touch-sensitive overlay. The touch-sensitive overlay and the electronic controller provide a touch-sensitive input interface 206 and the processor 240 interacts with the touch-sensitive overlay via the electronic controller. That is, the touchscreen display 204 acts as both an input interface 206 and an output interface 205.

In some embodiments, the electronic device 201 may communicate with any one of a plurality of fixed transceiver base stations of the wireless network 101 within its geographic coverage area. The electronic device 201 may send and receive communication signals over the wireless network 101 after the required network registration or activation procedures have been completed.

In some example embodiments, the auxiliary input/output (I/O) subsystems 250 may include an external communication link or interface, for example, an Ethernet connection. The electronic device 201 may include other wireless communication interfaces for communicating with other types of wireless networks, for example, a wireless network such as an orthogonal frequency division multiplexed (OFDM) network.

In the example embodiment illustrated, the electronic device 201 also includes a memory module 230 (which may be flash memory) and a memory module interface 232. The memory module 230 may be removable from the electronic device 201. Network access may be associated with a subscriber or user of the electronic device 201 via the memory module 230, which may be a Subscriber Identity Module (SIM) card for use in a GSM network or other type of memory module for use in the relevant wireless network. The memory module 230 may be inserted in or connected to the memory module interface 232 of the electronic device 201.

The electronic device 201 may store data 227 in an erasable persistent memory, which in one example embodiment is the flash memory 244. In various example embodiments, the data 227 may include service data having information required by the electronic device 201 to establish and maintain communication with the wireless network 101.

The data 227 may include one or more data objects 282a, 282b. The data objects 282a, 282b may be of a variety of data object types 284a, 284b. These data object types 284a, 284b may include action items (i.e. tasks), memos (which may also be referred to as notes), email messages, calendar entries, and/or contact records. The data object types 284a, 284b may include other types of data objects in other embodiments.

An action item (which may also be referred to as a task) is a record of an action that a user wishes to perform. That is, the action item represents something that the user intends to act upon and to complete. An action item may represent a concrete, defined action. For example, action item may be a reminder to review, email or follow up on something. Accordingly, an action item may be a record of an action that a user wishes to be reminded of. That is, the action item may be a record of a future action (i.e. an action that a user intends to perform in the future) and may serve as a record for a user to remind the user that an action is required.

In contrast, a memo (which may also be referred to as a note) is not a record of an action that is to be completed. The memo may, for example, be a reference, such as a reference document. No specific action may be planned for the memo and, therefore, a user does not wish to be reminded of the memo. The memo is simply stored so that a user may access the memo at an unspecified later date or time.

Data objects 282a, 282b may be stored in a notebook 280a, 280b. A notebook 280a, 280b is a virtual container or group, and may also, in some embodiments, be referred to as a container or a group or a folder. A notebook 280a, 280b groups data objects 282a, 282b of a common data object type

284a, 284b. That is, each notebook may be associated with a data object type 284a, 284b. In at least some embodiments, each notebook is associated with a single data object type 284a, 284b.

By way of example, in the embodiment of FIG. 2, the memory includes two notebooks 280a, 280b—a first notebook 280a, and a second notebook 280b. The first notebook 280a is associated with a first data object type 284a and the second notebook 280b is associated with a second data object type 284b (which may be different from the first data object type 284a). Each notebook 280a, 280b contains data objects 282a, 282b that have been formatted according to the data object type 284a, 284b associated with that notebook 280a, 280b. For example, the first notebook 280a stores data objects 282a that comply with one or more predetermined constraints 286 associated with the first data object type 284a, and the second notebook 280b stores data objects 282b that comply with one or more predetermined constraints 286 associated with the second data object type 284b. Data objects stored in a notebook may, therefore, comply with the predetermined constraints for that notebook.

In some embodiments, the first data object type 284a and/or the second data object type 284b may be an action item data object type. That is, the first notebook 280a and/or the second notebook 280b may be configured for storing action items. In some embodiments, the first data object type 284a and/or the second data object type 284b may be a memo data object type. That is, the first notebook 280a and/or the second notebook 280b may be configured for storing memos.

Data objects stored in a notebook may be required to comply with one or more predetermined constraints 286 that are effectively associated with that notebook. Accordingly, memory of the electronic device 201 may also store one or more predetermined constraints 286. The predetermined constraints 286 may specify rules, constraints, and/or parameters associated with different data object types 284a, 284b. That is, the predetermined constraints 286 may associate a data object type 284a, 284b with one or more rules, constraints, and/or parameters. The rules, constraints or parameters defined by the predetermined constraints 286 may vary for different data object type 284a, 284b. For example, memos may have a different constraint or set of constraints than action items.

The predetermined constraints 286 are, in at least some embodiments, constraints that are required by a sync server 132 (FIG. 1). That is, the predetermined constraints 286 may correspond to the data object constraints for the sync server 132 described above with reference to FIG. 1. As will be explained in greater detail below, in at least some embodiments, the predetermined constraints 286 may be used to ensure that a data object complies with data object constraints imposed by the sync server 132. That is, in at least some embodiments, the predetermined constraints 286 may ensure that data objects are sync friendly. In other embodiments, the predetermined constraints 286 may enforce at least some constraints that are not imposed by the sync server 132.

For example, the predetermined constraints 286 may, in some embodiments, specify that a data object that is classified as a memo (i.e. a data object that is stored in a notebook associated with a memo data object type) will not include a completion indicator and/or progress indicator. Similarly, in some embodiments, the predetermined constraints 286 may specify that a data object that is classified as an action item (which may also be referred to as a task) must have a completion indicator and/or progress indicator associated therewith.

Similarly, in some embodiments, the predetermined constraints 286 may require that data objects stored in a notebook having an action item data type, have a due date property associate therewith. The due date property may be reserved for storing a due data associated with action items. That is, the due date property may be configured for storing timing information for completing the action represented by the action item.

As will be explained in greater detail below, when a data object 282a, 282b is associated with a notebook 280a, 280b associated with a data object type 284a, 284b, the predetermined constraints 286 may be applied to that data object 282a, 282b based on the data object type 284a, 284b for the notebook. That is, each notebook may be configured for use with a specific data object type. When a data object is added to a notebook, it may inherit the properties of the data object type associated with that notebook. That is, the predetermined constraints 286 associated with the data object type for that notebook are applied to the data object.

In at least some embodiments the data 227 may also include one or more generic data objects 292. A generic data object 292 is a data object that is not associated with a specific data object type 284a, 284b. In at least some embodiments, the generic data object 292 may become either a data object of the first data object type 284a or a data object of the second data object type 284b or a data object of another data object type. For example, the generic data object 292 may be assigned to one of the notebooks 280a, 280b (e.g. user input may be received assigning the generic data object 292 to a notebook) and, in response, the electronic device may apply the predetermined constraints 286 associated with the data object type for that notebook to the generic data object. In at least some embodiments, this will allow the data object to be synced using the sync server 132 (FIG. 1).

In at least some embodiments, data objects may share a common format irrespective of the data object type that is associated with such data objects. For example, the data objects may have a common format irrespective of their type. For example, all data objects may be formatted as a generic data object 292 and may be capable of acting as any data object type associated with a hybrid application (i.e. any supported data object type). The generic data object 292 may include fields and/or parameters that may be used with all data object types (e.g. it may allow for input of fields that are associated with action item, such as a completion indicator). When the generic data object 292 is assigned to a notebook, the predetermined constraints 286 associated with the data object type for that notebook are enforced upon that data object. In at least some embodiments (not shown), one or more notebooks may be configured for storing generic data objects 292. For example, a notebook may not have a data object type associated therewith. In such notebooks, no predetermined constraints are associated with the data object type and the data object is permitted to exist in the notebook without having predetermined constraints applied to the data object. For example, the data object in the notebook that does not have a data object type associated therewith may exist without having to conform to predetermined constraints associated with a data object type.

In at least some embodiments, the electronic device may be configured to generate reminders for data objects that are action items based on timing information associated with such action items (the timing information may, for example, specific a time that a user wishes to be reminded of the action item). That is, the electronic device 201 may generate reminders for data objects that are stored in a notebook having an action item data object type. The reminder generated by the electronic device 201 based on the timing information may, for example, be a sensory based reminder, such as an audible reminder (provided on the speaker 256), a visual reminder (provided on the display 204), or a vibratory reminder (provided by a vibrator associated with the electronic device 201).

The data port 252 may be used for synchronization with a user's host computer system (not shown). The data port 252 may enable a user to set preferences through an external device or software application and extends the capabilities of the electronic device 201 by, for example, providing for information or software downloads to the electronic device 201 other than through the wireless network 101. This download path may, for example, be used to load an encryption key onto the electronic device 201 through a direct, reliable and trusted connection to thereby provide secure device communication.

In some example embodiments, the electronic device 201 is provided with a service routing application programming interface (API) which provides an application with the ability to route traffic, for example, through a serial data (i.e., USB) or Bluetooth® (Bluetooth® is a registered trademark of Bluetooth SIG, Inc.) connection to the host computer system using standard connectivity protocols. When a user connects their electronic device 201 to the host computer system via a USB cable or Bluetooth® connection, traffic that was destined for the wireless network 101 may automatically be routed to the electronic device 201 using the USB cable or Bluetooth® connection. Similarly, any traffic destined for the wireless network 101 may automatically sent over the USB cable Bluetooth® connection to the host computer system for processing.

The electronic device 201 may include or be connectable to a power source. In the embodiment illustrated, the power source is a battery 238, such as a rechargeable battery that may be charged, for example, through charging circuitry coupled to a battery interface 236 such as the serial data port 252. The battery 238 may provide electrical power to at least some of the electrical circuitry in the electronic device 201, and the battery interface 236 may provide a mechanical and electrical connection for the battery 238. The battery interface 236 may be coupled to a regulator (not shown) which may provide power V+ to the circuitry of the electronic device 201.

In some embodiments, a short-range communication subsystem 262 may provide for communication between the electronic device 201 and different systems or devices, which need not necessarily be similar devices. For example, the short-range communication subsystem 262 may include an infrared device and associated circuits and components, or a wireless bus protocol compliant communication mechanism such as a Bluetooth® communication module to provide for communication with similarly-enabled systems and devices.

A pre-determined set of applications that control basic device operations, including data and possibly voice communication applications may be installed on the electronic device 201 during or after manufacture. Additional applications and/or upgrades to an operating system 222 or software applications 224 may also be loaded onto the electronic device 201 through the wireless network 101, the auxiliary I/O subsystem 250, the data port 252, the short-range communication subsystem 262, or other suitable device subsystems 264. The downloaded programs or code modules may be permanently installed, for example, written into the program memory (i.e. the flash memory 244), or written into and executed from the RAM 246 for execution by the processor 240 at runtime.

In some example embodiments, the electronic device 201 may provide two principal modes of communication: a data communication mode and a voice communication mode. In the data communication mode, a received data signal such as a text message, an email message, or a web page download will be processed by the communication subsystem 211 and input to the processor 240 for further processing. For example, a downloaded web page may be further processed by a browser application or an email message may be processed by the email messaging application and output to the touchscreen display 204. A user of the electronic device 201 may also compose data objects, such as email messages, memos, action items, or generic data objects, for example, using the input interfaces 206, such as the touchscreen display 204. These composed items may be transmitted through the communication subsystem 211 over the wireless network 101.

In the voice communication mode, the electronic device 201 provides telephony functions and may operate, for example, as a typical cellular telephone. The overall operation may be similar to the data communication mode, except that the received signals may be output to the speaker 256 and signals for transmission may be generated by a transducer such as the microphone 258. The telephony functions may be provided by a combination of software/firmware (i.e., a voice communication module) and hardware (i.e., the microphone 258, the speaker 256 and input devices). Alternative voice or audio I/O subsystems, such as a voice message recording subsystem, may also be implemented on the electronic device 201. Although voice or audio signal output is typically accomplished primarily through the speaker 256, the touchscreen display 204 may also be used to provide an indication of the identity of a calling party, duration of a voice call, or other voice call related information.

The processor 240 operates under stored program control and executes software modules 220 stored in memory such as persistent memory, for example, in the flash memory 244. As illustrated in FIG. 2, the software modules 220 include operating system software 222 and software applications 224, such as a hybrid application 226 and/or a third party application 229.

In at least some embodiments, the software applications 224 include a hybrid application 226. The hybrid application 226 is configured to allow a generic data object 292 to be created. That is, the hybrid application 226 provides a user interface for allowing a generic data object to be created. The user interface may, for example, include a composition interface that allows text, images and/or videos to be added into a document, thereby creating a generic data object. The generic data object may then be assigned to one or more of the notebooks 280a, 280b to become a data object 282a, 282b in that notebook. When the generic data object 292 is assigned to a notebook, it ceases to be a generic data object 292. The electronic device 201 automatically applies predetermined constraints associated with the data object type for that notebook to the generic data object, thereby creating a data object conforming to the constraints for the data object type.

The hybrid application 226 is referred to, herein, as a hybrid application since it is configured to manage data objects of more than one data object type. For example, the hybrid application 226 may manage memos and may also manage action items.

Accordingly, the hybrid application 226 may be configured to provide management functions for managing notebooks and/or data objects. For example, the hybrid application 226 may be configured to accept input for: creation of new notebooks (which may cause a prompt to be generated requesting a data object type to be assigned to that notebook), modifying the data object type associated with a notebook (e.g. to remove the current data object type assigned to the notebook and replace it with another data object type) (which may cause the electronic device 201 to automatically apply predetermined constraints 286 associated with a newly associated data object type to existing data objects in that notebook), to move one or more data objects from one of the notebooks to another of the notebooks (which may cause the electronic device 201 to move the data object to the other notebook and to automatically apply the predetermined constraints associated with the data object type of the selected notebook to the data object), and/or to copy one or more data objects from one of the notebooks to another of the notebooks (which may cause the electronic device 201 to copy the data object to the other notebook and to automatically apply the predetermined constraints associated with the data object type of the selected notebook to the data object). The hybrid application may provide other management functions in addition to those described above.

Accordingly, in at least some embodiments, the hybrid application 226 may be configured to enforce the predetermined constraints. The hybrid application 226 may allow data objects (such as generic data objects) to be assigned to a notebook and, when a data object is assigned to a notebook, the hybrid application 226 may apply predetermined constraints 286 associated with that notebook to the data object (e.g. it may apply predetermined constraints corresponding to the data object type for the notebook).

While the predetermined constraints 286 are illustrated using a block that is separated from the hybrid application 226 in FIG. 2, in some embodiments, the predetermined constraints 286 may be included in the hybrid application 226 itself. For example, the hybrid application may be programmed with the predetermined constraints 286.

In at least some embodiments, the electronic device 201 may include an application programming interface (API) 225 that permits other applications (such as third party applications 229) to access at least some of the features provided by the hybrid application 226. The API 225 allows third party developers to integrate features provided by the hybrid application 226 into other applications 224.

The API 225 is, in at least some embodiments, configured to receive instructions from other applications 224 to allow those other applications 224 to access function or features provided by the hybrid application 226. For example, in at least some embodiments, the API 225 may allow other applications (such as third party applications 229) to assign a data object to a notebook 280*a*, 280*b*. For example, a data object may be created through a third party application. Then, the third party application 229 may assign the data object to a notebook 280*a*, 280*b* using the API. In response, the hybrid application 226 may automatically apply the predetermined constraints associated with that notebook (e.g. the predetermined constraints 286 associated with the data object type 284*a*, 284*b* for that notebook) to the data object.

The other applications 224 that may access some of the features of the hybrid application 226 through the API 225 may include a range of applications that are configured to create or access content. For example, the other applications 224 that may access the API 225 (e.g. in order to assign a data object created or accessed through the application to a specified notebook) may include, for example, third party navigation applications, Internet browser applications, address book applications, messaging applications, calendar applications, notepad applications, word processor applications, and/or media player applications. Each of the other applications 224 may include layout information defining the placement of particular fields and graphic elements (e.g. text fields, input fields, icons, etc.) in the user interface (i.e. the display 204). It will be appreciated that other application apart from those specifically listed above may access functions of the hybrid application 226 through the API 225.

Accordingly, input associating a data object with a notebook may be received at the API 225 from a third party application 229. In some embodiments, the hybrid application 226 may ensure that data objects that are assigned to a notebook using a third party application conform to the predetermined constraints 286 associated with that notebook (e.g. the predetermined constraints 286 associated with the data object type 284*a*, 284*b* for that notebook). It may do so by automatically applying such predetermined constraints to the data object based on the notebook. That is, it may identify the predetermined constraint or set of constraints associated with the notebook and may apply those to a data object. In some embodiments, if the third party application adds a data object to a notebook having an action item data object type (e.g. to a notebook that is configured for storing action items), then the hybrid application 226 may add a completion indicator and/or a due date property to the data object if it does not already include a completion indicator and/or a due date property. In some embodiments, if the third party application adds a data object to a notebook having a memo data object type (e.g. if it add the data object to a notebook that is configured for storing memos), then the hybrid application 226 may remove a completion indicator and/or due date property from the data object.

By ensuring that data objects that are added to a notebook by third party applications 229 comply with the predetermined constraints for that notebook, the hybrid application 226 may, in at least some embodiments, ensure that the data objects are able to sync using the sync server 132. That is, the hybrid application 226 effectively ensures that the data objects correspond to the data object constraints for the sync server 132.

In at least some embodiments, the API 225 may be configured to inform third party applications 229 of the predetermined constraints 286 associated with one or more notebooks. This may allow the third party application to generate a graphical user interface in accordance with the predetermined constraints. For example, interface elements may be generated that permit features or properties associated with a specific data object type to be input. For example, the API may, in some embodiments, inform the third party application of the predetermined constraints 286 associated with an action item data type. For example, it may specify that a data object that is an action item is to include a due date property and/or a completion indicator. Then, if a data object is active in the third party application, and that data object has been or is going to be assigned to a notebook that is configured for storing action items (e.g. if the notebook has an action item data object type), then the third party application may automatically generate a display screen including one or more interface elements for setting properties that may be unique to action items; for example, for setting a due date property and/or a completion indicator.

Similarly, the API may inform the third party application of the predetermined constraints 286 associated with a memo data type. For example, it may specify that a data object that is a memo is not to include a due date property and/or a completion indicator. Then, if a data object is active in the third party application, and that data object has been or is going to be assigned to a notebook that is configured for storing memos (e.g. if the notebook has a memo data object type), then the third party application may automatically generate a display screen that does not include the interface elements for setting a due date property and/or a completion indicator.

While the API is illustrated as being included within the hybrid application 226, in some embodiments, the API and the hybrid application may be separate from one another.

Functions and features provided by the hybrid application 226 will be described in greater detail below.

In at least some example embodiments, the operating system 222 may perform some or all of the functions of the hybrid application 226 and/or the API 225. In other example embodiments, the functions or a portion of the functions of the hybrid application 226 may be performed by one or more other applications. Further, while the hybrid application 226 has been illustrated as a single block, the hybrid application 226 may include a plurality of software modules. In at least some example embodiments, these software modules may be divided among multiple applications. For example, in at least some embodiments, a different software application or module may be used for classifying content items than is used for accessing such content items. For example, a first software application or module may be configured to perform one of the methods described below and a second software application or module may be configured to perform another one of the methods described below.

The software modules 220 or parts thereof may be temporarily loaded into volatile memory such as the RAM 246. The RAM 246 is used for storing runtime data variables and other types of data or information. Although specific functions are described for various types of memory, this is merely one example, and a different assignment of functions to types of memory could also be used.

Applying Constraint to Data Object

The following discussion will refer to example methods 300 (FIG. 3), 400 (FIG. 4) of applying a constraint to a data object based on a notebook to which that data object is assigned. The methods 300, 400 may, in at least some embodiments, be performed by the hybrid application 226. More particularly, the hybrid application 226 (and/or another application 224 stored in memory) may contain processor-executable instructions which, when executed, cause the processor 240 of the electronic device 201 to perform one or more of the methods described below.

Figure 3:
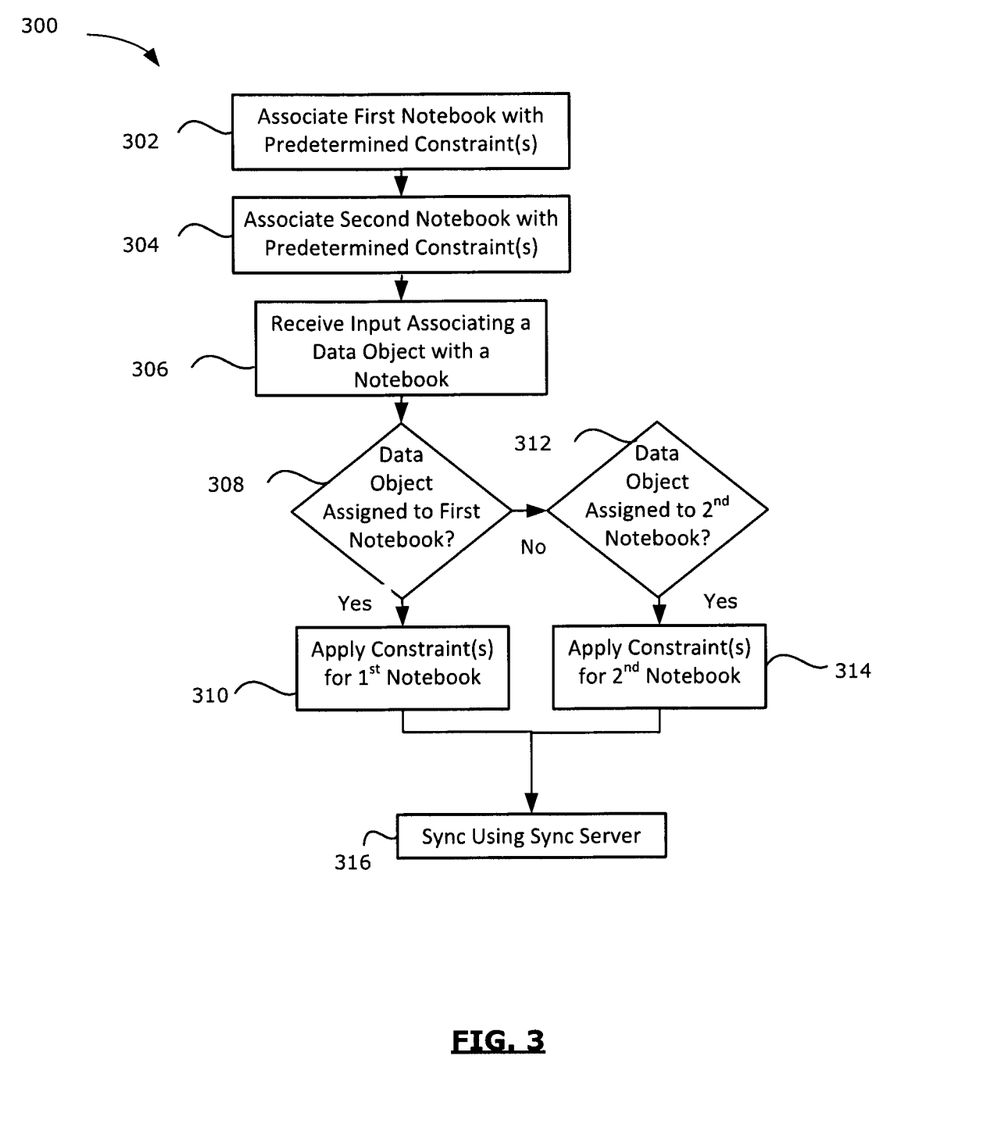
FIG. 3 illustrates a flowchart of an example method of applying one or more predetermined constraints to one or more data objects.

Referring first to FIG. 3, an example method 300 of applying a constraint is illustrated.

At 302, the electronic device 201 associates a first notebook 280a (FIG. 2) with one or more predetermined constraints 286. As noted in the discussion of FIG. 2 above, the first notebook 280a may, in some embodiments, be indirectly associated with one or more predetermined constraints 286. For example, the first notebook 280a may be associated with a data object type 284a. The data object type 284a defines the types of data objects which the notebook will be configured to store. Predetermined constraints 286 may be associated with the data object type 284a, effectively creating an association between the first notebook 280a and one or more predetermined constraints 286.

Such indirect associations may allow multiple notebooks to be created having the same data object types. For example, when a new notebook is created, it may be assigned (e.g. via user input) to a data object type. Based on the data object type, the notebook may effectively inherit the predetermined constraints.

As noted in the discussion of FIG. 2, in at least some embodiments, the predetermined constraints 286 may be associated with a sync server 132. That is, the predetermined constraints 286 may correspond to data object constraints that are required by a sync server 132 in order to effectively sync data objects.

The electronic device 201 may associate the first notebook 280a with the one or more predetermined constraints 286 when the first notebook is created. In at least some embodiments, when a notebook is created, a user may be prompted for input assigning the notebook to a data object type. For example, a user may select whether the notebook is an action item notebook (e.g. configured for storing action items) or a memo notebook (e.g. configured for storing memos), or a notebook of another type.

The electronic device 201 may, at 304, associate a second notebook 280b with one or more predetermined constraints 286. The second notebook 280b may be indirectly associated with the one or more predetermined constraints 286. For example, the second notebook 280b may be associated with a data object type 284b which is associated with one or more predetermined constraints 286. In at least some embodiments, the first notebook 280a and the second notebook 280b are associated with different data object types 284a, 284b. In at least some such embodiments, at least one of the predetermined constraints associated with the second notebook 280 is different than at least one of the predetermined constraints associated with the first notebook 280a. That is, a different rule or set of rules applies to the different notebooks.

While FIG. 3 illustrates an embodiment in which there are two notebooks, in other embodiments, there may be a greater number of notebooks. These notebooks may, in at least some embodiments, each be associated with a data object type and/or one or more predetermined constraints.

At 306, input is received associating a data object 282a, 282b with a notebook. The data object 282a, 282b is, in at least some embodiments, a generic data object 292. A generic data object 292 is a data object that is not associated with a specific data object type 284a, 284b. In at least some embodiments, the generic data object 292 may be created by the hybrid application 226. For example, the hybrid application may provide a user interface that allows the generic data object to be created. For example, the hybrid application may include a composition interface that allows text, images and/or videos to be added into a document that has not yet been assigned a data object type, thereby creating a generic data object. Input may be received through this interface to create a generic data object. The hybrid application may present a user with a selectable option to associate the generic data object with one of the notebooks. The input received at 306 associating the data object with a notebook may, for example, be received via such a selectable option.

As will be described in greater detail below with reference to FIG. 4, in at least some embodiments, the input received at 306 may be received via an API 225.

After the data object 282a, 282b is assigned to a notebook 280a, 280b, the electronic device 201 may apply (at 308, 310, 312, 314) one or more predetermined constraints to the data object based on the specific notebook to which that data object was assigned. More particularly, the one or more predetermined constraints associated with that notebook may be applied to the data object.

In some embodiments, at 308 and 312, the electronic device identifies the notebook that the data object was associated with. When the notebook associated with the data object is the first notebook, the electronic device 201 applies one or more predetermined constraints associated with the first notebook to the data object (at 310). When the notebook associated with the data object is the second notebook, the electronic device 201 applies one or more predetermined constraints associated with the second notebook to the data object (at 314). Thus, predetermined constraints are applied based on the specific notebook that a data object is associated with.

For example, in some embodiments, a predetermined constraint associated with a memo data object type specifies that data objects stored in a notebook having a memo data object type are not permitted to include a due date property. In at least some such embodiments, if the notebook to which the data object is assigned is configured for storing memos (e.g. if the data object type indicates that it is configured to store memos), then the electronic device may determine if the data object includes a due date property and, when the data object includes a due date property, may remove the due date property from the data object.

Similarly, in some embodiments, a predetermined constraint associated with a memo data object type specifies that data objects stored in a notebook having a memo data object type are not permitted to include a completion indicator. In at least some such embodiments, if the notebook to which the data object is assigned is configured for storing memos (e.g. if the data object type indicates that it is configured to store memos), then the electronic device may determine if the data object includes a completion indicator and, when the data object includes a completion indicator, may remove the completion indicator from the data object.

Similarly, in some embodiments, a predetermined constraint associated with an action item data object type specifies that data objects stored in a notebook having an action item data object type are required to include a completion indicator. In at least some such embodiments, if the notebook to which the data object is assigned is configured for storing action items (e.g. if the data object type indicates that it is configured to store action items), then the electronic device may determine if the data object includes a completion indicator and, when the data object does not include a completion indicator, may add a completion indicator to the data object.

Similarly, in some embodiments, a predetermined constraint associated with an action item data object type specifies that data objects stored in a notebook having an action item data object type are required to include a due date property. In at least some such embodiments, if the notebook to which the data object is assigned is configured for storing action items (e.g. if the data object type indicates that it is configured to store action items), then the electronic device may determine if the data object includes a due date property and, when the data object does not include a due date property, may add a due date property to the data object.

In at least some embodiments, when the hybrid application 226 adds a field or property required by the predetermined constraints 286 to a data object and that field or property is configurable (i.e. when it is a field or property whose value or contents may be set or adjusted), the electronic device may set the field or property to a predetermined default state and/or may prompt a user to set the field or property. For example, after adding a completion indicator and/or a due date property to a data object, the electronic device may set the completion indicator and/or due date property to a predetermined default state. For example, the completion indicator may be set to a not completed state which indicates that the action associated with the action item has not yet been completed. In some embodiments, after adding a completion indicator and/or a due date property to a data object, the electronic device may generate a prompt requesting user to provide input setting the state of a completion indicator and/or due date property.

In at least some embodiments, after the hybrid application 226 has determined that the data object in the notebook complies with the predetermined constraints for that notebook, at 316, the electronic device 201 may sync the data object using the sync server 132 (FIG. 1). More particularly, the electronic device 201 may sync the data object using the sync server 132 by transmitting data (such as the data object) to the sync server. For example, such data may be transmitted over a communication subsystem associated with the electronic device, such as the wireless communication subsystem 211. That is, the data object may be synced by communicating with the sync server using the communication subsystem.

Application Programming Interface

In at least some embodiments, the hybrid application 226 may include an API 225 which may help ensure that other applications 224 such as third party applications 229 comply with the predetermined constraints 286.

Figure 4:
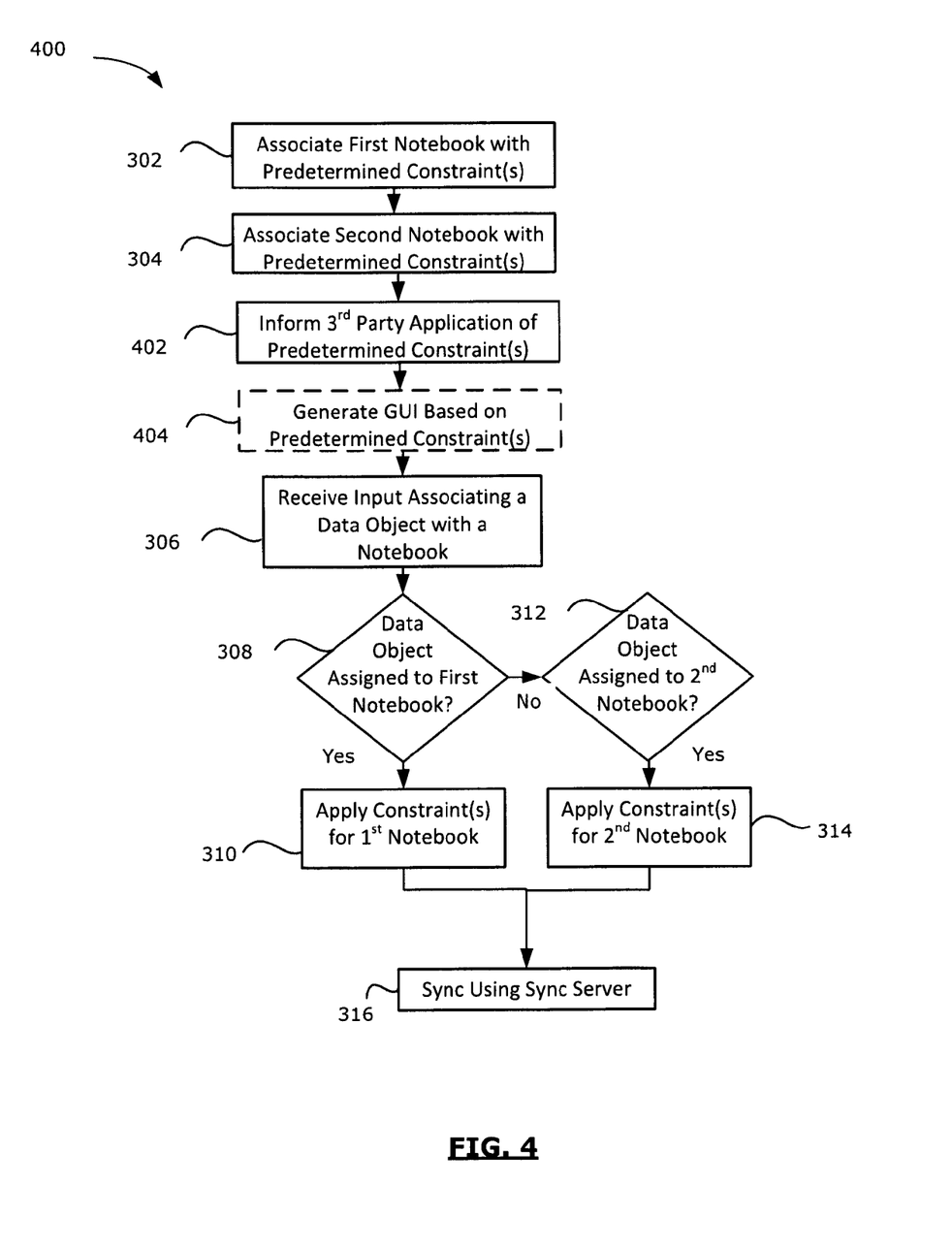
FIG. 4 is a flowchart of an example method of applying one or more predetermined constraints to one or more data objects.

Referring now to FIG. 4, an example of one such method 400 is illustrated. The method 400 includes many features that are discussed above with reference to FIG. 3. Common reference numerals are used to identify such features and the discussion of these features will not be repeated at length. In the embodiment of FIG. 4, an application programming interface 225 is provided on the electronic device 201. The API 225 is described above in the discussion of FIG. 2.

At 302 and 304 notebooks are associated with predetermined constraints. 302 and 304 are described in greater detail above with reference to FIG. 3.

At 402, the application programming interface informs one or more other applications, such as a third party application, of one or more predetermined constraints associated with one or more notebooks. For example, the API may inform the third party application of the constraints associated with a specific notebook. This may occur, for example, in response to a query from an application for the predetermined constraints. That is, another application (such as a third party application) may request the constraints from the API.

In at least some embodiments, at 404, in response to receiving the information at 402, the other application (e.g. the third party application) may generate a graphical user interface in accordance with the predetermined constraints received via the API. 404 is illustrated with broken lines to highlight that it is a feature that may be performed by another application, such as the third party application.

At 306, input is received associating a data object with a notebook. The API 225 may be configured to allow third party applications to assign a data object to a specified notebook. In at least some such embodiments, the input associating the data object with a notebook received at 306 may be received at the API from another application, such as a third party application.

Features 308, 310, 312, 314, 316 are discussed above with reference to FIG. 3.

While the present application is primarily described in terms of methods, a person of ordinary skill in the art will understand that the present application is also directed to various apparatus such as an electronic device 201 including a mobile communications device. The electronic device 201 includes components for performing at least some of the aspects and features of the described methods, which may be by way of hardware components (such as the memory 244 and/or the processor 240), software or any combination of the two, or in any other manner. Moreover, an article of manufacture for use with the apparatus, such as a pre-recorded storage device or other similar computer readable storage medium including program instructions recorded thereon, or a computer data signal carrying computer readable program instructions may direct an apparatus to facilitate the practice of the described methods. For example, a compute readable storage medium may include computer executable instructions for performing one or more of the methods described herein. It is understood that such apparatus and articles of manufacture also come within the scope of the present application.

The term "computer readable medium" or "computer readable storage medium" as used herein means any medium which can store instructions for use by or execution by a computer or other computing device including but not limited to, a portable computer diskette, a hard disk drive (HDD), a random access memory (RAM), a read-only memory (ROM), an erasable programmable-read-only memory (EPROM) or flash memory, an optical disc such as a Compact Disc (CD), Digital Versatile Disc (DVD) or Blu-Ray™ Disc, and a solid state storage device (e.g., NAND flash or synchronous dynamic RAM (SDRAM)).

Example embodiments of the present application are not limited to any particular operating system, system architecture, mobile device architecture, server architecture, or computer programming language.

The various example embodiments presented above are merely examples. Variations of the innovations described herein will be apparent to persons of ordinary skill in the art, such variations being within the intended scope of the present application. In particular, features from one or more of the above-described example embodiments may be selected to create alternative example embodiments including a sub-combination of features which may not be explicitly described above. In addition, features from one or more of the above-described example embodiments may be selected and combined to create alternative example embodiments including a combination of features which may not be explicitly described above. Features suitable for such combinations and sub-combinations would be readily apparent to persons skilled in the art upon review of the present application as a whole. The subject matter described herein and in the recited claims intends to cover and embrace all suitable changes in technology.

The invention claimed is:

1. A processor-implemented method comprising:
  associating a first notebook with one or more predetermined constraints, the first notebook being a notebook configured for storing memos, the one or more predetermined constraints specifying that data objects associated with the first notebook are not permitted to include a due date property or specify that data objects associated with the first notebook are not permitted to include a completion indicator;
  associating a second notebook with one or more predetermined constraints, at least one of the predetermined constraints associated with the second notebook being different than the one or more predetermined constraints associated with the first notebook;
  receiving input associating a data object with a notebook; and
  when the notebook associated with the data object is the first notebook, applying the one or more predetermined constraints associated with the first notebook to the data object; or
  when the notebook associated with the data object is the second notebook, applying the one or more predetermined constraints associated with the second notebook to the data object,
  wherein applying the one or more predetermined constraints comprises modifying the data object,
  and wherein applying the one or more predetermined constraints associated with the first notebook comprises:
    when the one or more predetermined constraints specify that data objects associated with the first notebook are not permitted to include a due date property:
      determining if the data object includes a due date property; and
      when the data object includes a due date property, removing the due date property from the data object, or
    when the one or more predetermined constraints specify that data objects associated with the first notebook are not permitted to include a completion indicator:
      determining if the data object includes a completion indicator; and
      when the data object includes a completion indicator, removing the completion indicator from the data object.

2. The method of claim 1, further comprising, prior to receiving input associating the data object with a notebook:
  providing a hybrid application, the hybrid application providing a user interface for allowing a generic data object to be created; and
  receiving input creating a generic data object,
  and wherein the input associating a data object with a notebook is input that associates the generic data object with a notebook.

3. The method of claim 1, wherein the second notebook is a notebook configured for storing action items and wherein one or more of the predetermined constraints associated with the second notebook specify that data objects associated with the second notebook must include a completion indicator, and wherein applying the one or more predetermined constraints associated with the second notebook to the data object comprises:
  determining if the data object includes a completion indicator; and
  when the data object does not include a completion indicator, adding the completion indicator to the data object.

4. The method of claim 3, wherein applying the one or more predetermined constraints associated with the second notebook to the data object further comprises:
  setting the completion indicator to a not completed state.

5. The method of claim 1, wherein the one or more predetermined constraints are associated with a sync server.

6. The method of claim 5, further comprising, after applying the one or more predetermined constraints:
  syncing the data object using the sync server.

7. The method of claim 1, further comprising:
  providing an application programming interface, the application programming interface being configured to inform third party applications of the predetermined constraints associated with one or more notebooks.

8. The method of claim 7, further comprising:
  generating a graphical user interface in accordance with the predetermined constraints received via the application programming interface.

9. The method of claim 1, further comprising:
  providing an application programming interface, the application programming interface being configured to allow third party applications to assign a data object to a specified notebook, and wherein the input associating a data object with a notebook is received at the application programming interface from a third party application.

10. The method of claim 1, wherein applying the one or more predetermined constraints comprises adding a field or a property to the data object.

11. The method of claim 1, wherein applying the one or more predetermined constraints comprises removing a field or a property from the data object.

12. An electronic device comprising:
a processor; and
a memory coupled with the processor, the memory containing processor executable instructions which, when executed by the processor, cause the processor to:
associate a first notebook with one or more predetermined constraints, the first notebook being a notebook configured for storing memos, the one or more predetermined constraints specifying that data objects associated with the first notebook are not permitted to include a due date property or specify that data objects associated with the first notebook are not permitted to include a completion indicator;
associate a second notebook with one or more predetermined constraints, at least one of the predetermined constraints associated with the second notebook being different than the one or more predetermined constraints associated with the first notebook;
receive input associating a data object with a notebook; and
when the notebook associated with the data object is the first notebook, apply the one or more predetermined constraints associated with the first notebook to the data object; or
when the notebook associated with the data object is the second notebook, apply the one or more predetermined constraints associated with the second notebook to the data object,
wherein applying the one or more predetermined constraints comprises modifying the data object,
and wherein applying the one or more predetermined constraints associated with the first notebook comprises:
when the one or more predetermined constraints specify that data objects associated with the first notebook are not permitted to include a due date property:
determining if the data object includes a due date property; and
when the data object includes a due date property, removing the due date property from the data object, or
when the one or more predetermined constraints specify that data objects associated with the first notebook are not permitted to include a completion indicator:
determining if the data object includes a completion indicator; and
when the data object includes a completion indicator, removing the completion indicator from the data object.

13. The electronic device of claim 12, wherein the processor executable instructions are further configured to cause the processor to, prior to receiving input associating the data object with a notebook:
provide a hybrid application, the hybrid application providing a user interface for allowing a generic data object to be created; and
receive input creating a generic data object,
and wherein the input associating a data object with a notebook is input that associates the generic data object with a notebook.

14. The electronic device of claim 12, wherein the second notebook is a notebook configured for storing action items and wherein one or more of the predetermined constraints specify that data objects associated with the second notebook must include a completion indicator, and wherein applying the one or more predetermined constraints associated with the second notebook to the data object comprises:
determining if the data object includes a completion indicator; and
when the data object does not include a completion indicator, adding the completion indicator to the data object.

15. The electronic device of claim 12, wherein the one or more predetermined constraints are associated with a sync server, and wherein the electronic device further comprises a communication subsystem for communicating with the sync server, and wherein the processor executable instructions are further configured to cause the processor to:
syncing the data object by communicating with the sync server using the communication subsystem.

16. A non-transitory computer readable storage medium comprising computer executable instructions for:
associating a first notebook with one or more predetermined constraints, the first notebook being a notebook configured for storing memos, the one or more predetermined constraints specifying that data objects associated with the first notebook are not permitted to include a due date property or specify that data objects associated with the first notebook are not permitted to include a completion indicator;
associating a second notebook with one or more predetermined constraints, at least one of the predetermined constraints associated with the second notebook being different than the one or more predetermined constraints associated with the first notebook;
receiving input associating a data object with a notebook; and
when the notebook associated with the data object is the first notebook, applying the one or more predetermined constraints associated with the first notebook to the data object; or
when the notebook associated with the data object is the second notebook, applying the one or more predetermined constraints associated with the second notebook to the data object,
wherein applying the one or more predetermined constraints comprises modifying the data object,
and wherein applying the one or more predetermined constraints associated with the first notebook comprises:
when the one or more predetermined constraints specify that data objects associated with the first notebook are not permitted to include a due date property:
determining if the data object includes a due date property; and
when the data object includes a due date property, removing the due date property from the data object, or
when the one or more predetermined constraints specify that data objects associated with the first notebook are not permitted to include a completion indicator:
determining if the data object includes a completion indicator; and
when the data object includes a completion indicator, removing the completion indicator from the data object.

* * * * *